United States Patent
Takahashi et al.

(10) Patent No.: US 10,945,156 B2
(45) Date of Patent: Mar. 9, 2021

(54) USER EQUIPMENT THAT CONTROLS BROADCAST INFORMATION AND BASE STATION THAT CONTROLS BROADCAST INFORMATION

(71) Applicant: NTT DOCOMO, INC., Tokyo (JP)

(72) Inventors: Hideaki Takahashi, Tokyo (JP); Kazuaki Takeda, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/541,430

(22) PCT Filed: Apr. 5, 2016

(86) PCT No.: PCT/JP2016/061111
§ 371 (c)(1),
(2) Date: Jul. 3, 2017

(87) PCT Pub. No.: WO2016/163356
PCT Pub. Date: Oct. 13, 2016

(65) Prior Publication Data
US 2017/0367008 A1 Dec. 21, 2017

(30) Foreign Application Priority Data

Apr. 10, 2015 (JP) .............................. JP2015-081022
May 14, 2015 (JP) .............................. JP2015-098862
Aug. 24, 2015 (JP) .............................. JP2015-165299

(51) Int. Cl.
*H04W 28/06* (2009.01)
*H04W 48/10* (2009.01)
(Continued)

(52) U.S. Cl.
CPC .......... *H04W 28/06* (2013.01); *H04W 48/10* (2013.01); *H04W 48/16* (2013.01); *H04B 17/318* (2015.01);
(Continued)

(58) Field of Classification Search
CPC ... H04W 28/06; H04W 48/10; H04W 84/042; H04W 88/02; H04W 88/08; H04W 48/16; H04B 17/318
See application file for complete search history.

(56) References Cited

U.S. PATENT DOCUMENTS

2009/0247163 A1* 10/2009 Aoyama ............... H04W 48/10
                                                                                455/436
2011/0205952 A1* 8/2011 Gou ........................ H04L 49/90
                                                                                370/312

(Continued)

FOREIGN PATENT DOCUMENTS

JP      2017-510224 A    4/2017
WO     2015012654 A1    1/2015
WO     2015/143244 A1   9/2015

OTHER PUBLICATIONS

International Search Report issued in PCT/JP2016/061111 dated May 24, 2016 (5 pages).

(Continued)

*Primary Examiner* — Ian N Moore
*Assistant Examiner* — Latresa A McCallum
(74) *Attorney, Agent, or Firm* — Osha Bergman Watanabe & Burton LLP

(57) ABSTRACT

Control techniques of broadcast information reception operations at user equipment having coverage enhancement functionalities are disclosed. One aspect of the present invention relates to user equipment, comprising: a transmission and reception unit configured to transmit and receive radio signals to/from a base station; and a broadcast infor-
(Continued)

mation combination unit configured to receive system information blocks from a cell across multiple windows.

2 Claims, 11 Drawing Sheets

(51) Int. Cl.
*H04W 48/16* (2009.01)
*H04B 17/318* (2015.01)
*H04W 84/04* (2009.01)
*H04W 88/02* (2009.01)
*H04W 88/08* (2009.01)

(52) U.S. Cl.
CPC .......... *H04W 84/042* (2013.01); *H04W 88/02* (2013.01); *H04W 88/08* (2013.01)

(56) References Cited

U.S. PATENT DOCUMENTS

| | | | | |
|---|---|---|---|---|
| 2012/0157090 | A1* | 6/2012 | Kim | H04W 4/08 455/424 |
| 2012/0163305 | A1* | 6/2012 | Nimbalker | H04W 52/0206 370/329 |
| 2012/0202487 | A1* | 8/2012 | Kazmi | H04W 48/10 455/432.1 |
| 2013/0028161 | A1* | 1/2013 | Maeda | H04L 5/0048 370/311 |
| 2014/0204866 | A1* | 7/2014 | Siomina | H04L 25/03821 370/329 |
| 2014/0293908 | A1* | 10/2014 | Kumar | H04W 48/12 370/329 |
| 2014/0348037 | A1* | 11/2014 | Yang | H04L 5/16 370/280 |
| 2016/0142981 | A1 | 5/2016 | Yi et al. | |

OTHER PUBLICATIONS

Written Opinion of the International Searching Authority issued in PCT/JP2016/061111 dated May 24, 2016 (5 pages).
3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).
3GPP TSG-RAN Meeting #67; RP-150492; Ericsson; "Revised WI: Further LTE Physical Layer Enhancements for MTC"; Shanghai, China; Mar. 9-12, 2015 (9 pages).
3GPP TS 36.300 V12.5.0; "3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2; (Release 12)"; Mar. 2015 (251 pages).
3GPP TS 36.331 V12.5.0; "3rd Generation Partnership Project; Technical Specification Group Radio Access Network; Evolved Universal Terrestrial Radio Access (E-UTRA); Radio Resource Control (RRC); Protocol specification (Release 12)"; Mar. 2015 (445 pages).
3GPP TSG-RAN WG2 Meeting #89; R2-150256; Huawei, HiSilicon; "SIB for Rel-13 low complexity MTC"; Athens, Greece; Feb. 9-12, 2015 (7 pages).
Extended European Search Report issued in corresponding European Application No. 16776522.1, dated Feb. 27, 2018 (11 pages).
Nokia Networks, Nokia Corporation; "Design of Common Control Messages for MTC"; 3GPP TSG-RAN WG1 Meeting #79, R1-144996; San Francisco, USA; Nov. 17-21, 2014 (4 pages).
Alcatel-Lucent, Alcatel-Lucent Shanghai Bell; "Options for LC-MTC UE SIB Transmission"; 3GPP TSG-WG RAN2 #89, R2-150467; Athens, Greece; Feb. 9-13, 2015 (5 pages).
Office Action issued in counterpart Japanese Patent Application No. 2017-510987, dated Jul. 10, 2018 (6 Pages).
Office Action issued in corresponding European Application No. 16776522.1, dated Nov. 7, 2018 (8 pages).
Office Action issued in corresponding European Application No. 16776522.1, dated Aug. 21, 2019 (7 pages).
Alcatel-Lucent, Alcatel-Lucent Shanghai Bell; "Considerations on PRACH for LC-MTC"; 3GPP TSG RAN WG1 Meeting #80, R1-150132; Athens, Greece; Feb. 9-13, 2015 (6 pages).
Office Action issued in the counterpart Chinese Patent Application No. 201680020321.5, dated Jan. 10, 2020 (13 pages).
Office Action issued in the counterpart European Patent Application No. 16776522.1, dated May 27, 2020 (15 pages).
Office Action issued in the counterpart Chinese Patent Application No. 201680020321.5, dated Sep. 4, 2020 (13 pages).

* cited by examiner

SystemInformationBlockType1 message

```
-- ASN1START

SystemInformationBlockType1 ::=        SEQUENCE {
<< skip unrelated part >>
    schedulingInfoList                 SchedulingInfoList,
<< skip unrelated part >>
    si-WindowLength                    ENUMERATED {
                                         ms1, ms2, ms5, ms10, ms15, ms20,
                                         ms40},
<< skip unrelated part >>
}

SystemInformationBlockType1-v13xy-IEs ::=  SEQUENCE {
    schedulingInfoList-v13xy               SchedulingInfoList-v13xy    OPTIONAL,
    nonCriticalExtension                   SEQUENCE {}                 OPTIONAL
}

SchedulingInfoList ::= SEQUENCE (SIZE (1..maxSI-Message)) OF SchedulingInfo
SchedulingInfoList-v13xy ::= SEQUENCE (SIZE (1..maxSI-Message)) OF SchedulingInfo-v13xy SchedulingInfo ::=   SEQUENCE {
    si-Periodicity       ENUMERATED {
                           rf8, rf16, rf32, rf64, rf128, rf256, rf512},
    sib-MappingInfo      SIB-MappingInfo
}

SchedulingInfo-v13xy ::=   SEQUENCE {
    si-WindowMultiplex-r13     ENUMERATED {
                                 n2, n4, n8, n16, n32, n64, n128, n256, n512},
}

SIB-MappingInfo ::= SEQUENCE (SIZE (0..maxSIB-1)) OF SIB-Type

SIB-Type ::=   ENUMERATED {
                 sibType3, sibType4, sibType5, sibType6,
                 sibType7, sibType8, sibType9, sibType10,
                 sibType11, sibType12-v920, sibType13-v920,
                 sibType14-v1130, sibType15-v1130,
                 sibType16-v1130, sibType17-v1250, sibType18-v1250,
                 ..., sibType19-v1250}

-- ASN1STOP
```

*si-WindowMultiplex*
Number of multiplexing SI-window for the corresponding SIs, where n2 denotes 2, n4 denotes 4 and so on.

MasterInformationBlock

```
-- ASN1START

MasterInformationBlock ::=    SEQUENCE {
    dl-Bandwidth                  ENUMERATED {
                                      n6, n15, n25, n50, n75, n100},
    phich-Config                  PHICH-Config,
    systemFrameNumber             BIT STRING (SIZE (8)),
    SIB1periodRepetition          ENUMERATED {
                                      n2, n4, n8, n16, n32, n64},
    spare                         BIT STRING (SIZE (7))
}

-- ASN1STOP
```

*SIB1periodRepetition*
Number of SIB1 period for which the SIB1 period is multiplexed.

USER EQUIPMENT THAT CONTROLS
BROADCAST INFORMATION AND BASE
STATION THAT CONTROLS BROADCAST
INFORMATION

TECHNICAL FIELD

The present invention relates to a radio communication system.

BACKGROUND ART

In presently designed Release 13 (Rel-13) of LTE (Long Term Evolution), various functions required to be provided in a MTC (Machine Type Communication) type of user equipment (UE) are discussed. As one example, the user equipment (Low Cost User Equipment: LC UE) having the transmission and reception bandwidth limited to 1.4 MHz for cost reduction is discussed. As another example, since there is a likelihood that the MTC terminals may be located in areas, such as depth areas in buildings and/or underground areas, where building penetration loss is large and radio communication is difficult, the user equipment designed for enhanced coverage (Enhanced Coverage User Equipment: EC UE) is discussed.

From these two viewpoints, four UE patterns are assumed as follows, pattern 1) existing user equipment that has the system bandwidth of the maximum 20 MHz and does not have the coverage enhancement function;

pattern 2) user equipment that has a limited transmission and reception bandwidth such as 1.4 MHz and does not have the coverage enhancement function;

pattern 3) user equipment that has the system bandwidth of the maximum 20 MHz and the coverage enhancement function; and pattern 4) user equipment that has a limited transmission and reception bandwidth such as 1.4 MHz and the coverage enhancement function.

In the LTE system, broadcast information regarding cells such as a master information block (MIB) and a system information block (SIB) is periodically transmitted. In the existing LTE system, the MIB is assumed to be transmitted in the cycle of 40 ms, and the user equipment can soft combine the MIB repeatedly transmitted in up to four times in the cycle. Also, the SIB 1 is defined to be transmitted in the cycle of 80 ms, and the user equipment can soft combine the SIB 1 repeatedly transmitted in up to four times in the cycle. Further, SIBx (SIB 2, SIB 3, . . . ) other than the SIB 1 are stored and transmitted in system information (SI) in accordance with mapping indicated in schedulingInfo in the SIB 1. For example, as illustrated in FIG. 1, the SIB 2 may be stored in SI-1 and transmitted in the cycle of 160 ms. The SIBs 3 and 6 may be stored in SI-2 and transmitted in the cycle of 320 ms. The SIB 5/6 may be stored in SI-3 and transmitted in the cycle of 320 ms. The SIB 10/11 may be stored in SI-4 and transmitted in the cycle of 320 ms. The SIB 11 may be stored in SI-5 and transmitted in the cycle of 320 ms. (Here, if the SIB 11 is stored in the SI-4, the SI-5 is not configured.) In other words, the SI-1 to SI-5 are transmitted in the SI cycle of 320 ms.

Here, the SI can be transmitted at arbitrary number of times in an SI window, and the user equipment can soft combine the SI received in the SI window. In the illustrated example, the period of the SI window is set to 20 ms. The period or size of the SI window is common over the respective SIs, and the SI windows do not overlap with each other. The SIB having the same cycle can be multiplexed into the same SI.

PRIOR ART TECHNICAL DOCUMENT

Non-Patent Document

Non-patent document 1: 3GPP TR 36.888, "Study on provision of low-cost Machine-Type Communications (MTC) User Equipments (UEs) based on LTE"
Non-patent document 2: 3GPP RP-150492, "Further LTE Physical Layer Enhancements for MTC", Rel-13 Work Item Description

SUMMARY OF INVENTION

Problem to be Solved by the Invention

The normal user equipment having the frequency band unlimited enables transmission and reception with the system bandwidth and can receive the existing broadcast information (the MIB and the SIBx) as stated above. The SIBx is repeatedly transmitted for enhanced coverage, and the user equipment may power combine (soft combine) the received SIBx and form the SIBx. Meanwhile if the repetitions of transmission of the SIBx increase, overhead to broadcast the SIBx increases, which decreases efficiency of radio utilization.

Also, if the user equipment has the coverage enhancement function, any specific control for causing the user equipment to communicate with the base station with using the coverage enhancement function (EC UE) or communicate with the base station without using the coverage enhancement function (normal UE) has not been discussed.

In light of the above-stated problem, an object of the present invention is to provide control techniques for reception operations of broadcast information at the user equipment having the coverage enhancement function.

Means for Solving the Problem

In order to achieve the above object, one aspect of the present invention relates to user equipment, comprising: a transmission and reception unit configured to transmit and receive radio signals to/from a base station in a first frequency bandwidth or a second frequency bandwidth smaller than the first frequency bandwidth; a cell measurement unit configured to detect a cell served by the base station and measure reception quality of signals received from the detected cell; and a broadcast information reception control unit configured to compare the reception quality with a predetermined threshold and control reception of broadcast information depending on the comparison.

Another aspect of the present invention relates to abase station, comprising: a cell management unit configured to manage a cell to communicate with user equipment; and a broadcast information transmission unit configured to transmit broadcast information on the cell, wherein the broadcast information transmission unit transmits broadcast information for the user equipment supporting a first frequency bandwidth and broadcast information for a limited bandwidth for the user equipment supporting a second frequency bandwidth smaller than the first frequency bandwidth.

A still further aspect of the present invention relates to user equipment, comprising: a transmission and reception unit configured to transmit and receive radio signals to/from a base station; and a broadcast information combination unit configured to form broadcast information periodically transmitted from a cell by soft combining the broadcast information received across multiple cycles.

A still further aspect of the present invention relates to a base station, comprising: a cell management unit configured to manage a cell to communicate with user equipment; and a broadcast information transmission unit configured to transmit broadcast information on the cell, wherein the broadcast information transmission unit indicates a number of windows used by the user equipment to combine a second system information block in an information element in a first system information block transmitted from the cell at a first cycle.

Advantage of the Invention

According to the present invention, the control techniques for reception operations of the broadcast information at the user equipment having the coverage enhancement function can be provided.

BRIEF DESCRIPTION OF DRAWINGS

FIG. 10 is a diagram for illustrating exemplary signaling according to one embodiment of the present invention; and FIG. 11 is a diagram for illustrating exemplary signaling according to one embodiment of the present invention.

EMBODIMENTS OF THE INVENTION

Embodiments of the present invention are described below with reference to the drawings.

In embodiments below, user equipment and a base station having the coverage enhancement function are disclosed. In embodiments as stated below, the user equipment determines whether to use the coverage enhancement function to receive the broadcast information depending on reception quality at its installation location. If the user equipment uses the coverage enhancement function, for the broadcast information transmitted periodically from a cell, the normal type of user equipment supporting the system bandwidth (for example, 20 MHz) forms the broadcast information transmitted from the base station by soft combining the broadcast information received across multiple cycles. On the other hand, the low-cost type of user equipment supporting only a limited frequency bandwidth (for example, 1.4 MHz) forms the broadcast information transmitted from the base station by receiving the broadcast information for the limited bandwidth, which is transmitted repeatedly from the cell, at multiple times. In this manner, the broadcast information for the cell can be formed from a larger amount of the broadcast information received across the multiple cycles, compared to the conventional reception manner where the broadcast information received in the respective cycles is combined, which can address the problem where the coverage enhancement makes it difficult to receive the broadcast information.

Figure 2A:
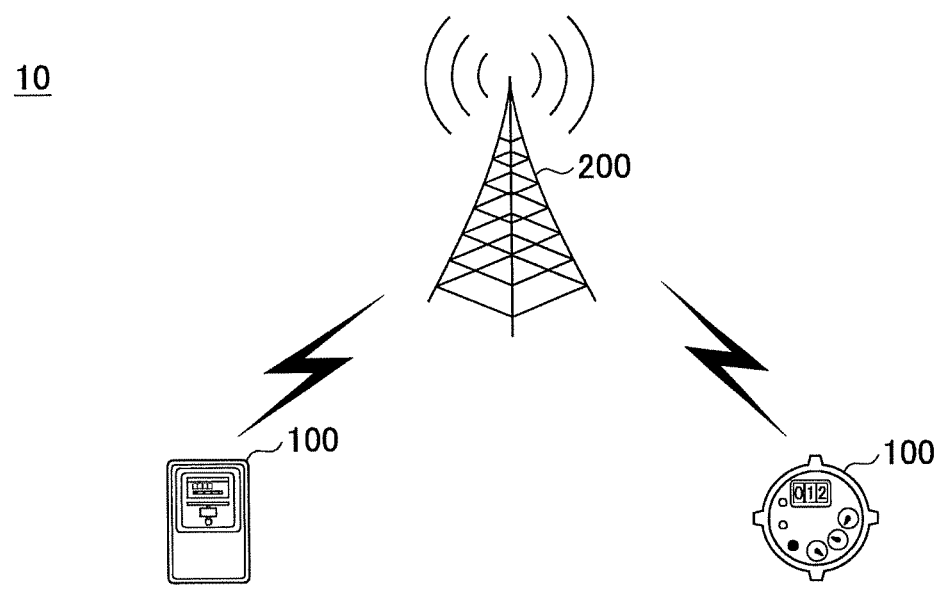
FIG. 2A is a schematic diagram for illustrating a radio communication system according to one embodiment of the present invention.

A radio communication system according to one embodiment of the present invention is described with reference to FIG. 2A. FIG. 2A is a schematic diagram for illustrating a radio communication system according to one embodiment of the present invention.

As illustrated in FIG. 2A, the radio communication system 10 has user equipment 100 and a base station 200. For example, the radio communication system 10 may be an LTE system or an LTE-Advanced system. In the illustrated embodiment, only the single base station 200 is illustrated, but a large number of base stations 200 are disposed to cover a service area of the radio communication system 10.

Figure 1:
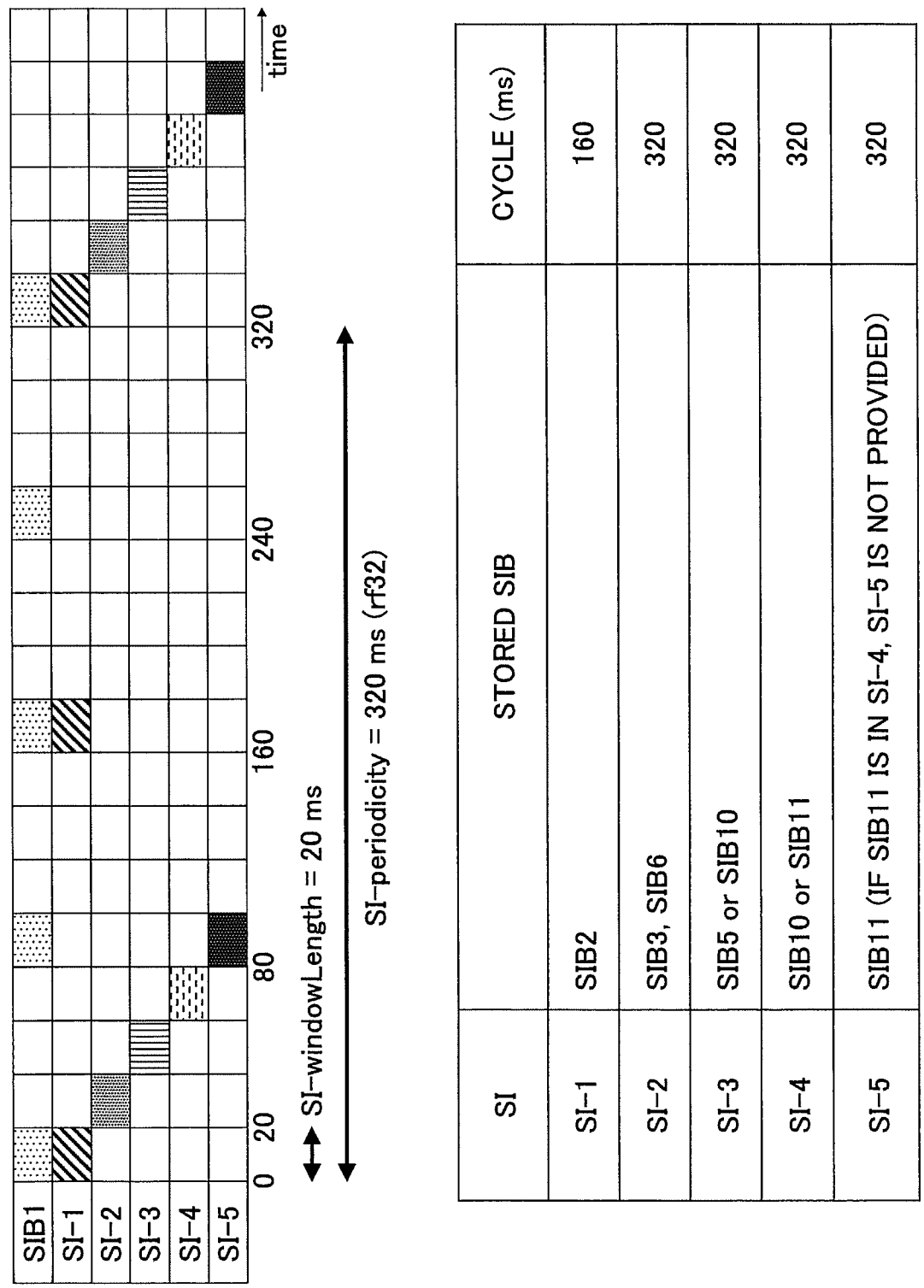
FIG. 1 is a diagram for illustrating exemplary transmission cycles of conventional system information.

The user equipment 100 transmits and receives radio signals to/from the base station 200 via a cell served by the base station 200. As illustrated, the user equipment 100 is implemented as an MTC terminal installed in a power meter, a water meter and a gas meter, for example, and may be, but is not limited to it, any appropriate information processing device having radio communication functionalities such as a smartphone, a cellular phone, a tablet, a mobile router and a wearable terminal. Also, the user equipment 100 may be of a normal type supporting the system bandwidth (20 MHz or the like in the LTE system) or of a low-cost (LC) type supporting only a limited frequency bandwidth (1.4 MHz or the like, for example). Furthermore, the user equipment 100 may be of a normal coverage type supporting a normal coverage for a cell and performing conventional reception operations of system information as described with reference to FIG. 1 or may have a coverage enhancement function supporting an enhanced coverage where it is difficult to obtain the system information in the conventional reception operations.

Figure 2B:
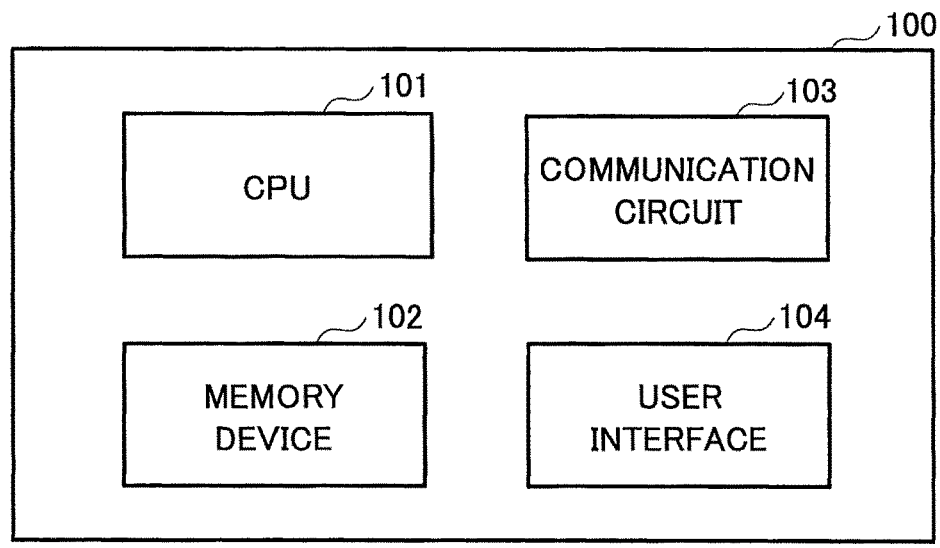
FIG. 2B is a block diagram for illustrating a hardware arrangement of user equipment according to one embodiment of the present invention.
Figure 2C:
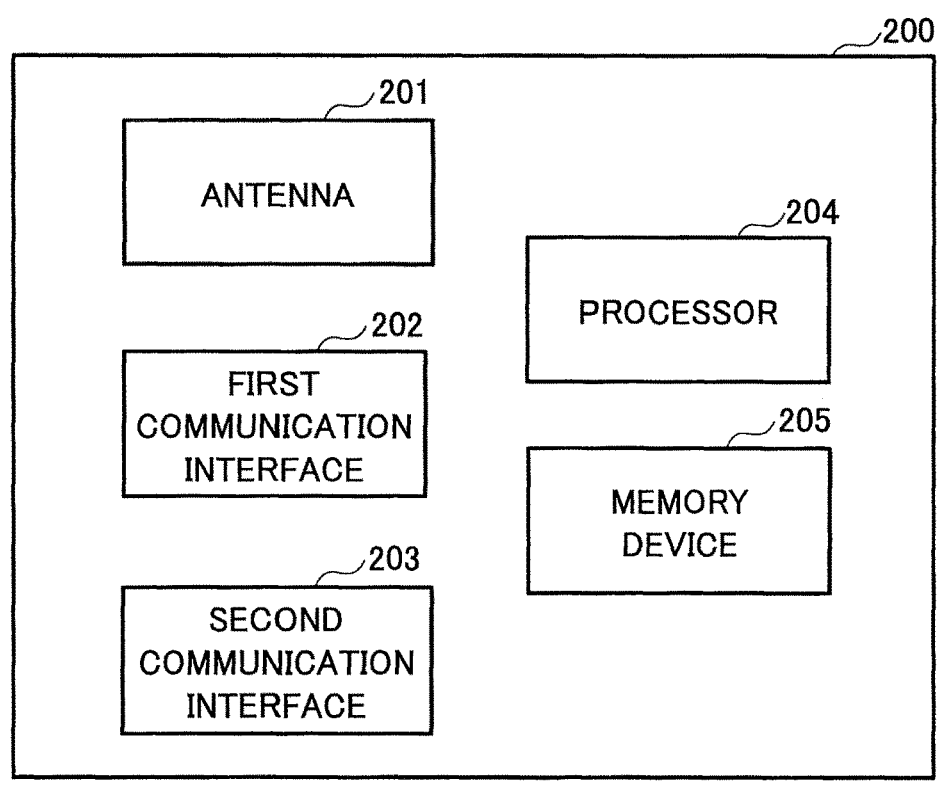
FIG. 2C is a block diagram for illustrating a hardware arrangement of a base station according to one embodiment of the present invention.

As illustrated in FIG. 2B, the user equipment 100 is arranged with a CPU (Central Processing Unit) 101 such as a processor, a memory device 102 such as a RAM (Random Access Memory) and a flash memory, a radio communication device 103 for transmitting and receiving radio signals to/from the base station 200, a user interface 104 such as an input and output device and a peripheral device, and so on. For example, functions and operations of the user equipment 100 as stated below may be implemented by the CPU 101 processing or executing data and/or programs stored in the memory device 102. However, the user equipment 100 is not limited to the above-stated hardware arrangement and may be formed of circuits for implementing one or more of operations as stated below.

The base station 200 wirelessly connects to the user equipment 100 to transmit downlink (DL) packets received from an upper station and/or server communicatively connected to a core network (not shown) to the user equipment 100 and uplink (UL) packets received from the user equipment 100 to the server. Also, the base station 200 periodically transmits the broadcast information on cells such as a master information block (MIB) and a system information block (SIBx) as described in detail below.

As illustrated in 2C, the base station 200 is typically arranged with hardware resources such as an antenna 201 for transmitting and receiving radio signals to/from the user equipment 100, a first communication interface 202 (X2 interface or the like) for communicating with adjacent base stations 200, a second communication interface 203 (S1 interface or the like) for communicating with a core network, a processor 204 and/or a circuit for processing signals transmitted and received to/from the user equipment 100 and a memory device 205. Functions and operations of the base station 200 as stated below may be implemented by the processor 204 processing or executing data and/or programs stored in the memory device 205. However, the base station 200 is not limited to the above-stated hardware arrangement and may have any other appropriate hardware arrangement.

Figure 3:
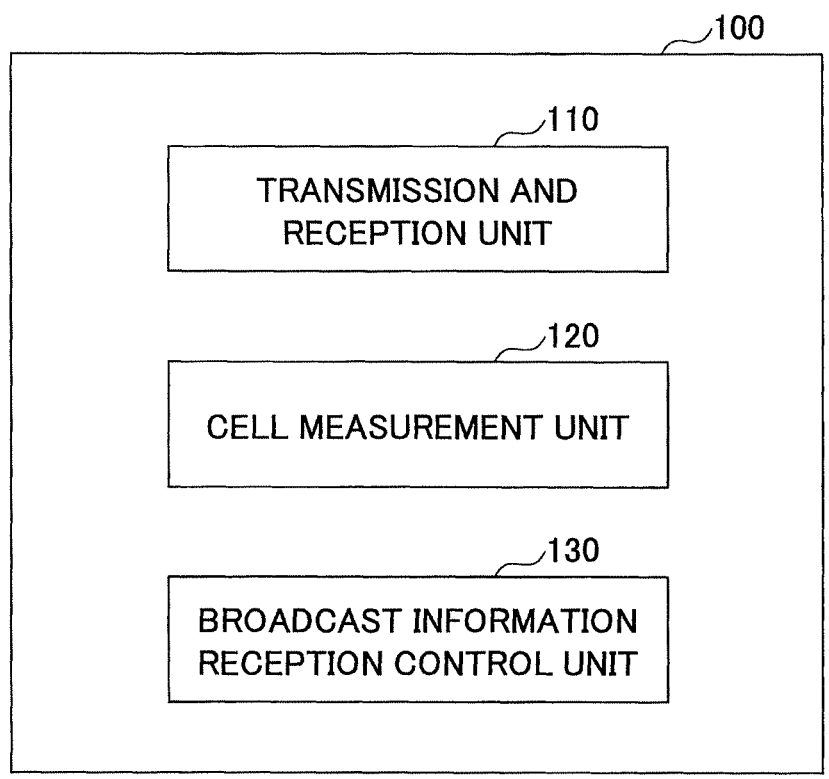
FIG. 3 is a block diagram for illustrating an arrangement of the user equipment according to one embodiment of the present invention.

Next, the user equipment according to one embodiment of the present invention is described with reference to FIG. 3. FIG. 3 is a block diagram for illustrating an arrangement of the user equipment according to one embodiment of the present invention.

As illustrated in FIG. 3, the user equipment 100 has a transmission and reception unit 110, a cell measurement unit 120 and a broadcast information reception control unit 130.

The transmission and reception unit 110 transmits and receives radio signals to/from the base station 200 in a first frequency bandwidth or a second frequency bandwidth smaller than the first frequency bandwidth. For example, the first frequency bandwidth may be the system bandwidth (20 MHz or the like) in the LTE system, and the second frequency bandwidth may be a limited frequency bandwidth (1.4 MHz or the like) for the LC type. Specifically, if the user equipment 100 is of a normal type supporting the system bandwidth, the transmission and reception unit 110 can communicate with the base station 200 in any one of the first frequency bandwidth and the second frequency bandwidth. On the other hand, if the user equipment 100 is of the LC type supporting only the limited frequency bandwidth, the transmission and reception unit 110 communicates with the base station 200 in the second frequency bandwidth.

In this embodiment, the transmission and reception unit 110 receives the broadcast information from the base station 200 in accordance with an operating mode determined by the broadcast information reception control unit 130. For example, if the broadcast information reception control unit 130 selects a normal coverage mode, the transmission and reception unit 110 receives the broadcast information in accordance with the conventional reception manner for the system information as described with reference to FIG. 1. On the other hand, if the broadcast information reception control unit 130 selects an enhanced coverage mode, the transmission and reception unit 110 receives the broadcast information in accordance with a reception manner as stated below.

The cell measurement unit 120 detects a cell served by the base station 200 and measures reception quality of signals received from the detected cell. Specifically, when the user equipment 100 is powered on, the cell measurement unit 120 detects a communication available cell by scanning the whole frequency band. Then, the cell measurement unit 120 measures an RSRP (Reference Signal Received Power) or an RSRQ (Reference Signal Received Quality) for the signals received from the detected cell and transmits measurements to the broadcast information reception control unit 130. Here, if multiple cells are detected, the cell measurement unit 120 may indicate the maximum RSRP or RSRQ in the RSRPs or RSRQs for signals received from the respective cells to the broadcast information reception control unit 130 or may indicate the RSRP or RSRQ higher than or equal to a predetermined threshold to the broadcast information reception control unit 130. For example, the predetermined threshold may be set to a level where the transmission and reception unit 110 can receive the broadcast information in the enhanced coverage mode.

The broadcast information reception control unit 130 compares reception quality with the predetermined threshold and controls reception of the broadcast information depending on the comparison. Specifically, upon receiving the reception quality such as the RSRP or the RSRQ for the detected cell from the cell measurement unit 120, the broadcast information reception control unit 130 determines whether the reception quality is lower than the predetermined threshold and instructs the transmission and reception unit 110 to receive the broadcast information in a reception scheme of the broadcast information, that is, the normal coverage mode or the enhanced coverage mode. In other words, if the measured reception quality is lower than the predetermined threshold, the broadcast information reception control unit 130 controls the transmission and reception unit 110 to receive the broadcast information in the enhanced coverage mode, and if the measure reception quality is higher than or equal to the threshold, on the other hand, the broadcast information reception control unit 130 determines that the coverage enhancement function is unnecessary and controls the transmission and reception unit 110 to receive the broadcast information in the normal coverage mode.

Figure 4:
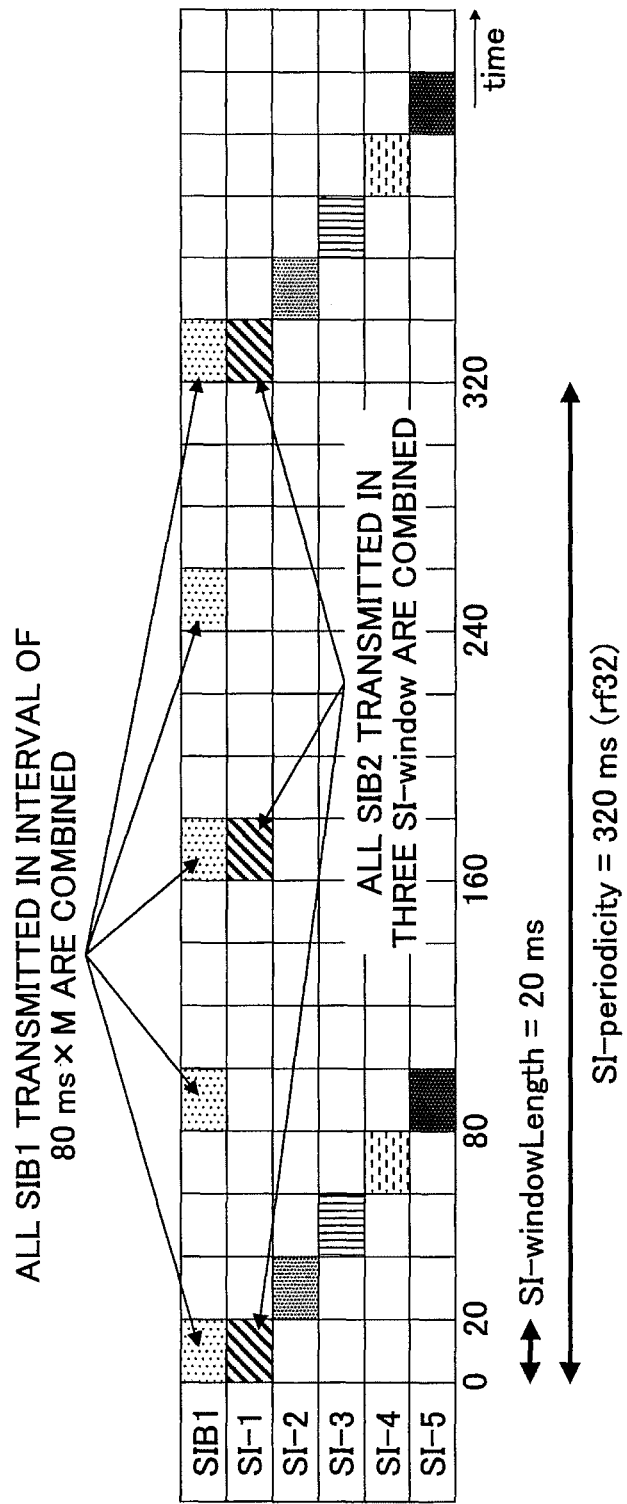
FIG. 4 is a schematic diagram for illustrating reception operations of the broadcast information at the user equipment according to one embodiment of the present invention.

In one embodiment, the transmission and reception unit 110 can receive the broadcast information transmitted from a cell in any of the first frequency bandwidth and the second frequency bandwidth, and if the reception quality is lower than the predetermined threshold, for the broadcast information periodically transmitted from the cell, the broadcast information reception control unit 130 may control the transmission and reception unit 110 to soft combine the broadcast information received across multiple cycles to form the broadcast information. Specifically, it is assumed that the user equipment 100 supports the first frequency bandwidth, that is, is of the normal type supporting the system bandwidth. Then, if the measured reception quality is lower than the predetermined threshold, the transmission and reception unit 110 may receive the MIB transmitted at the cycle of 40 ms, and for SIB 1 transmitted at the cycle of 80 ms, the broadcast information reception control unit 130 may instruct the transmission and reception unit 110 to soft combine all the SIB is received across M cycles (M≥2) as illustrated in FIG. 4. In the illustrated example, M=5. Here, the parameter M may be set to a fixed value in accordance with the specification or may be configurable in the MIB indicated from the base station 200. Furthermore, for SIBx of SIB 2 and so on, the broadcast information reception control unit 130 may instruct the transmission and reception unit 110 to soft combine all SIs received in N SI windows (N≥2). In the illustrated example, N=3, and the parameter N value may be indicated in SIB 1, for example, it may be indicated in an enhanced IE in schedulingInfo in SIB 1. According to this embodiment, the SIB transmitted from the base station 200 can be formed by combining the SIB 1 received across multiple cycles and SIBx received across multiple SI windows. In this manner, the SIB can be formed at a higher accuracy compared to the conventional reception scheme where SIBx received in the respective cycles and the respective SI windows are combined, which can address the problem where it is difficult to receive the system information due to coverage enhancement.

Figure 5:
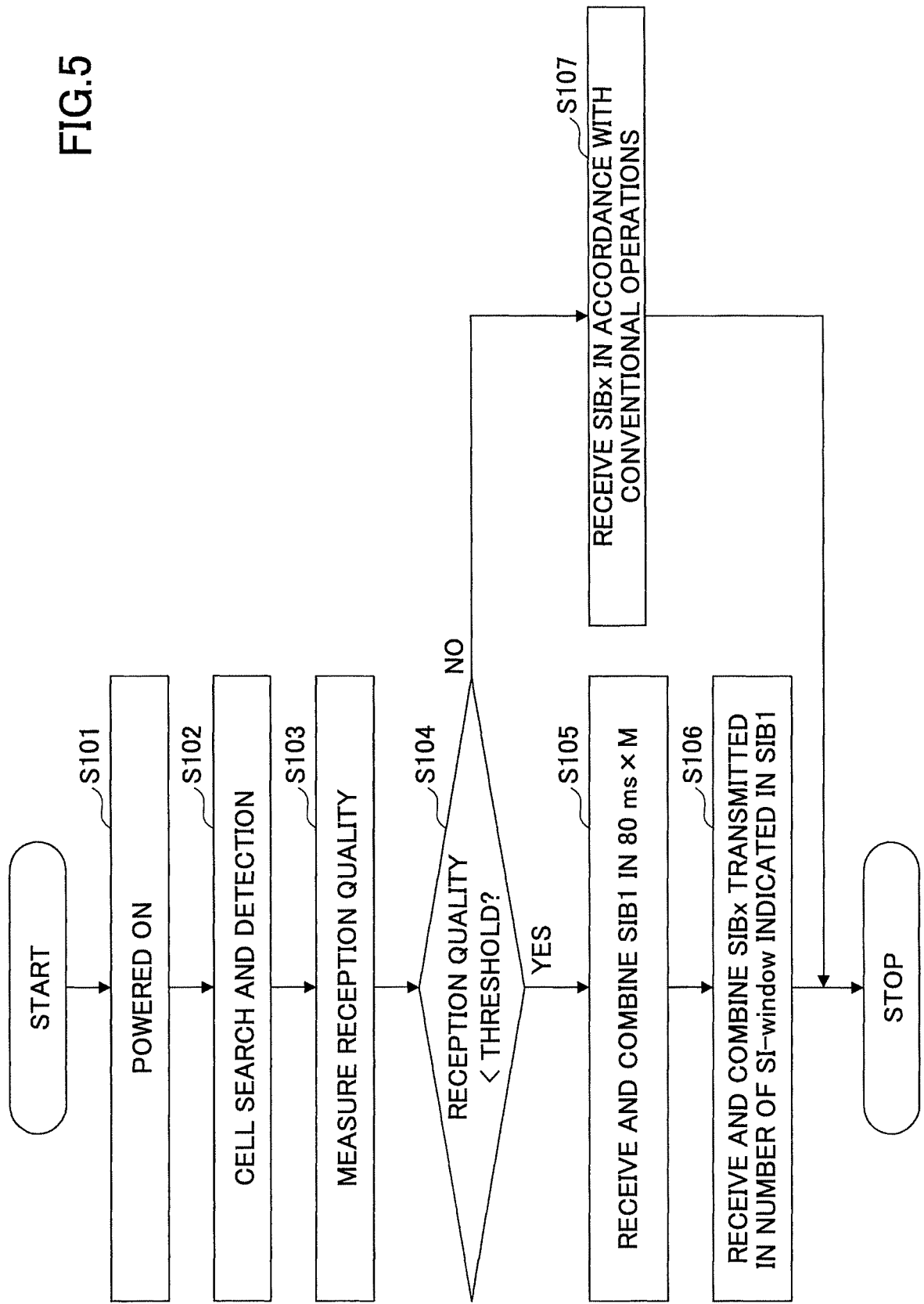
FIG. 5 is a flowchart for illustrating the reception operations of the broadcast information at the user equipment according to one embodiment of the present invention.

A specific flow of the present embodiment is described with reference to FIG. 5. At step S101, the user equipment 100 is powered on.

At step S102, the cell measurement unit 120 performs cell search by scanning the whole frequency band, for example, to detect a communication available cell.

At step S103, the cell measurement unit 120 measures the reception quality (an RSRP, an RSRQ or the like) of signals received from the detected cell and indicates the measured reception quality to the broadcast information reception control unit 130.

At step S104, the broadcast information reception control unit 130 determines whether the reception quality is lower than a predetermined threshold.

If the reception quality is lower than the predetermined threshold (S104: Yes), at step S105, the broadcast information reception control unit 130 instructs the transmission and reception unit 110 to form SIB 1 transmitted from the cell by combining SIB is received across the period of 80 ms×M.

At step S106, the broadcast information reception control unit 130 instructs the transmission and reception unit 110 to form respective SIBx transmitted from the cell by combining subsequent SIBxs (SIB 2, 3, . . . ) received across N SI windows in accordance with the parameter N indicated in the received SIB 1.

On the other hand, if the reception quality is higher than or equal to the predetermined threshold (S104: No), at step S107, the broadcast information reception control unit 130 instructs the transmission and reception unit 110 to receive the respective SIBs in accordance with the conventional reception scheme of system information as described with reference to FIG. 1.

In one embodiment, the transmission and reception unit 110 can receive the broadcast information transmitted from a cell in only the second frequency bandwidth, and if the reception quality is lower than the predetermined threshold, the broadcast information reception control unit 130 may receive the broadcast information for the limited bandwidth repeatedly transmitted from the cell at a first number of times. Also, if the reception quality is higher than or equal to the predetermined threshold, the broadcast information reception control unit 130 may control the transmission and reception unit 110 to receive the broadcast information for the limited bandwidth repeatedly transmitted from the cell at a second number of times less than the first number of times to form the broadcast information. Specifically, it is assumed that the user equipment 100 is of the LC type supporting only the second frequency bandwidth, that is, supporting only the limited bandwidth. Then, if the measured reception quality is lower than the predetermined threshold, the transmission and reception unit 110 may receive the MIB transmitted at the cycle of 40 ms, and the broadcast information reception control unit 130 may receive the broadcast information for the limited bandwidth repeatedly transmitted from the base station 200 at M times (M≥2) and form the broadcast information transmitted from the base station 200 by soft combining the received broadcast information. Here, for the broadcast information for the limited bandwidth, MIB is the same as the existing MIB whereas SIB 1 (MTC-SIB 1) having a size smaller than or equal to six resource blocks considered for transmission and reception bandwidth of 1.4 MHz may be used for SIB 1, for example.

On the other hand, if the measured reception quality is higher than or equal to the predetermined threshold, the transmission and reception unit 110 may receive MIB transmitted at the cycle of 40 ms, and the broadcast information reception control unit 130 may receive the broadcast information for the limited bandwidth repeatedly transmitted from the base station 200 at N times (M≥N) and form the broadcast information transmitted from the base station 200 by soft combining the received broadcast information. In this case, the user equipment 100 is located in a position having relatively good reception quality and accordingly can form the broadcast information transmitted from the base station 200 by soft combining the broadcast information for the limited bandwidth received at a less number of times. Specifically, if the reception quality is higher than or equal to the predetermined threshold, the broadcast information reception control unit 130 may control the transmission and reception unit 110 to receive the broadcast information for the limited bandwidth at a second number of times by interleaving reception of the broadcast information for the limited bandwidth repeatedly transmitted from the cell at a first number of times or to receive the broadcast information for the limited bandwidth at the initial second number of times repeatedly transmitted from the cell at the first number of times. For example, if it is assumed that M=10 and N=5 in this example, the transmission and reception unit 110 may receive MTC-SIB 1, which is repeatedly transmitted from the cell ten times, every one time or at the initial five times. The transmission and reception unit 110 may form the MTC-SIB 1 transmitted from the base station 200 by soft combining the received five NTC-SIB 1s. As a result, the reception occasions can be reduced, which can save power consumption at the user equipment 100.

After receiving the MTC-SIB 1 in this fashion, the transmission and reception unit 110 may similarly perform subsequent reception of SIBx and/or RACH (Random Access Channel) procedure. For example, instead of a PDCCH (Physical Downlink Control Channel), the transmission and reception unit 110 may receive a repeatedly transmitted EPDCCH (Enhanced PDCCH) as a control channel.

Figure 6:
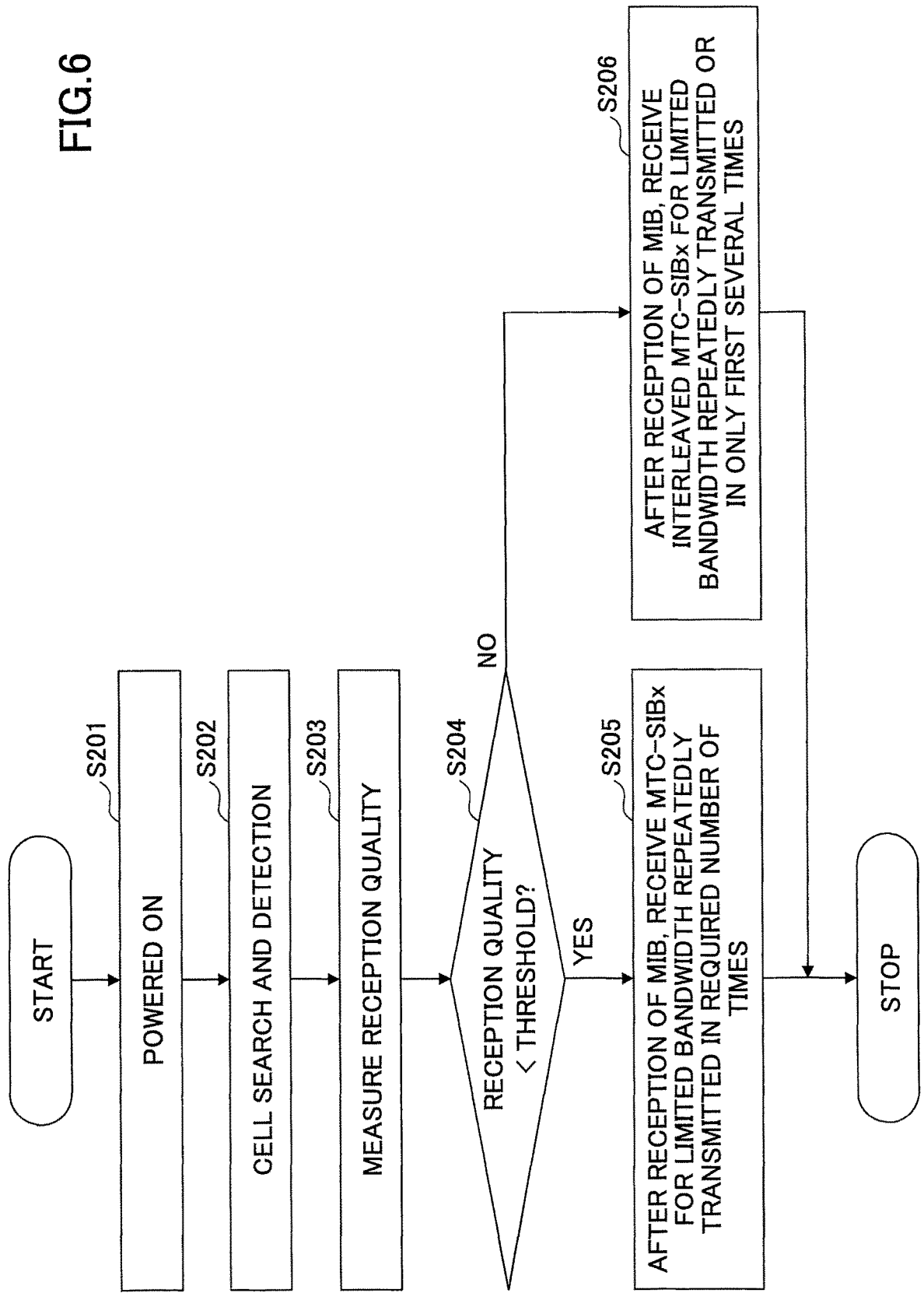
FIG. 6 is a flowchart for illustrating the reception operations of the broadcast information at the user equipment according to one embodiment of the present invention.

A specific flow of the present embodiment is described with reference to FIG. 6. At step S201, the LC type of user equipment 100 is powered on.

At step S202, the cell measurement unit 120 performs cell search by scanning the whole frequency band, for example, to detect a communication available cell.

At step S203, the cell measurement unit 120 measures the reception quality (RSRP, RSRQ or the like) for signals received from the detected cell and indicates the measured reception quality to the broadcast information reception control unit 130.

At step S204, the broadcast information reception control unit 130 determines whether the reception quality is lower than the predetermined threshold.

If the reception quality is lower than the predetermined threshold (S204: Yes), at step S205, after receiving MIB, the broadcast information reception control unit 130 may instruct the transmission and reception unit 110 to receive the broadcast information for the limited bandwidth repeatedly transmitted from the base station 200 at M times (M≥2) and soft combine the received broadcast information to form the broadcast information transmitted from the base station 200. Here, for the broadcast information for the limited bandwidth, the base station 200 may transmit MIB similar to the existing MIB and SIB 1 (MTC-SIB 1) having a size smaller than or equal to six resource blocks discussed for transmission and reception bandwidth of 1.4 MHz.

On the other hand, if the reception quality is higher than or equal to the threshold (S204: No), at step S206, after receiving the MIB, the broadcast information reception control unit 130 may instruct the transmission and reception 110 to receive the broadcast information for the limited bandwidth repeatedly transmitted from the base station 200 at N times (M≥N) and soft combine the received broadcast information to form the broadcast information transmitted from the base station 200. For example, the broadcast information reception control unit 130 may control the transmission and reception unit 110 to receive the broadcast information for the limited bandwidth at N times by interleaving the broadcast information for the limited bandwidth repeatedly transmitted from the cell at M times or receive the broadcast information for the limited bandwidth at the initial N times.

In one embodiment, the transmission and reception unit 110 can receive the broadcast information transmitted from a cell in any of a first frequency bandwidth and a second frequency bandwidth, and if the reception quality is lower than a predetermined threshold, the broadcast information reception control unit 130 may control the transmission and reception unit 110 to receive the broadcast information for the limited bandwidth at a first number of times periodically transmitted from a cell to from the broadcast information. Specifically, it is assumed that the user equipment 100 is of a normal type supporting the first frequency bandwidth, that is, the system bandwidth. Then, if the indicated reception quality is lower than the predetermined threshold, the transmission and reception unit 110 may receive the MIB transmitted at the cycle of 40 ms, and the broadcast information reception control unit 130 may receive the broadcast information for the limited bandwidth repeatedly transmitted from the base station 200 at M times (M≥2) and soft combine the received broadcast information to form the broadcast information transmitted from the base station 200. Here, for the broadcast information for the limited bandwidth, the MIB similar to the existing MIB is used whereas the SIB 1 (MTC-SIB 1) having a size smaller than or equal to six resource blocks discussed for transmission and reception bandwidth of 1.4 MHz may be used.

Figure 7:
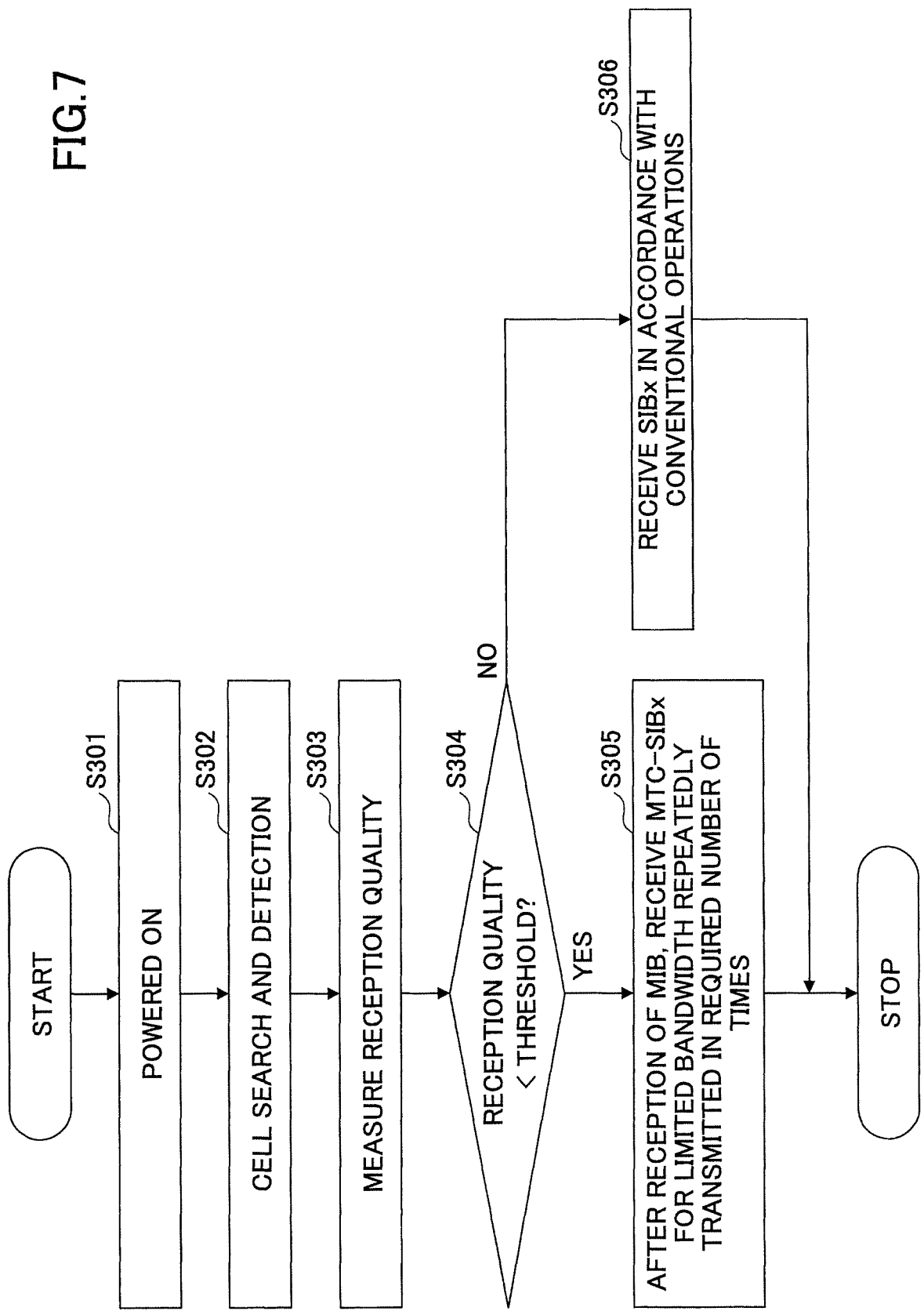
FIG. 7 is a flowchart for illustrating the reception operations of the broadcast information at the user equipment according to one embodiment of the present invention.

A specific flow of the present embodiment is described with reference to FIG. 7. At step S301, the LC type of user equipment 100 is powered on.

At step S302, the cell measurement unit 120 performs cell search by scanning the whole frequency band, for example, to detect a communication available cell.

At step S303, the cell measurement unit 120 measures the reception quality (RSRP, RSRQ or the like) of signals received from the detected cell and indicates the measured reception quality to the broadcast information reception control unit 130.

At step S304, the broadcast information reception control unit 130 determines whether the reception quality is lower than a predetermined threshold.

If the reception quality is lower than the predetermined threshold (S304: Yes), at step S305, after receiving the MIB, the broadcast information reception unit 130 may instruct the transmission and reception unit 110 to receive the broadcast information for the limited bandwidth repeatedly transmitted from the base station 200 at M times (M≥2) and soft combine the received broadcast information to form the broadcast information transmitted from the base station 200. Here, the base station 200 may transmit the MIB similar to the existing MIB and the SIB 1 (MTC-SIB 1) having a size smaller than or equal to six resource blocks discussed for transmission and reception bandwidth of 1.4 MHz as the broadcast information for the limited bandwidth.

On the other hand, if the reception quality is higher than or equal to the predetermined threshold (S304: No), at step S306, the broadcast information reception control unit 130 instructs the transmission and reception unit 110 to receive respective SIBs in accordance with a conventional reception scheme of system information as described with reference to FIG. 1.

In one embodiment, the broadcast information reception control unit 130 may control reception of the broadcast information in accordance with an enhanced coverage level (EC level) broadcast from the base station 200. Specifically, the base station 200 indicates the EC level applied to the MTC-SIB 1 in spare bits in a PBCH (Physical Broadcast Channel). Upon determining that the measured reception quality is lower than the predetermined threshold and coverage enhancement is required, the broadcast information reception control unit 130 obtains repetition information (including the number of repetitions, a TBS (Transport Block Size) or the like) of the MTC-SIB 1 transmitted in the PBCH and receives the broadcast information in the enhanced coverage mode based on the repetition information. For example, the EC level may be represented in two bits, "00" may indicate that the coverage enhancement is not applied, "01" may indicate EC level 1, "10" may indicate EC level 2 and "11" may indicate EC level 3. For example, in the case where "00" is indicated, even if the reception quality is lower than the predetermined threshold, the broadcast information reception control unit 130 may instruct the transmission and reception unit 110 to receive respective SIBs in accordance with a conventional reception scheme of system information without using the coverage enhancement function. Accordingly, if an operator of the radio communication system 10 does not desire the user equipment 100 to use the coverage enhancement function, the EC level "00" may be indicated. Also, higher EC levels mean that the coverage enhancement function is more strongly applied, and if a higher EC level is indicated, for example, the broadcast information reception control unit 130 may set the number of reception times M of the above-stated broadcast information (MTC-SIB 1) for the limited bandwidth to a greater value.

As stated above, if the measured reception quality is higher than or equal to the threshold, the broadcast information reception control unit 130 controls the transmission and reception unit 110 to receive the broadcast information in the normal coverage mode. However, measurement accuracy of the reception quality (RSRP or RSRQ) by the cell measurement unit 120 may be insufficient. Accordingly, if the transmission and reception unit 110 has failed to receive the broadcast information in the normal coverage mode or if the RACH procedure is unsuccessful, the broadcast information reception control unit 130 may operate in the enhanced coverage mode based on the repetition information for the MTC-SIB 1 transmitted in the above-stated PBCH.

Next, the base station according to one embodiment of the present invention is described with reference to FIG. 8. FIG.

8 is a block diagram for illustrating an arrangement of the base station according to one embodiment of the present invention.

Figure 8:
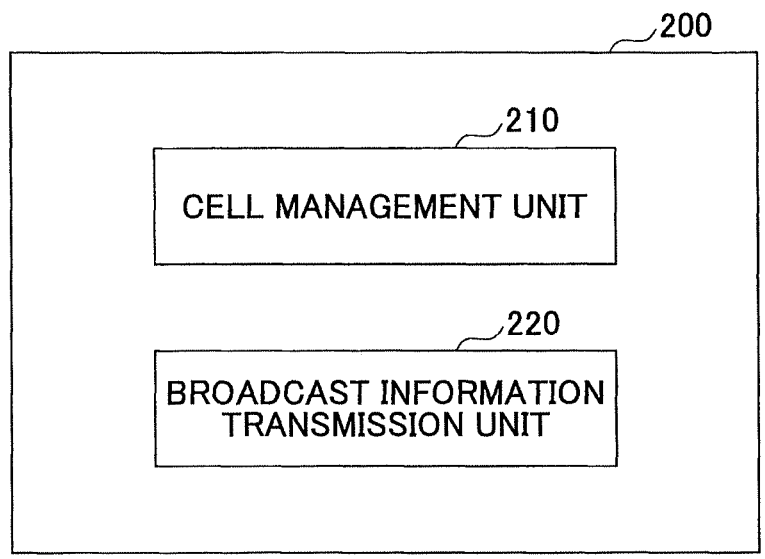
FIG. 8 is a block diagram for illustrating an arrangement of the base station according to one embodiment of the present invention.

As illustrated in FIG. 8, the base station 200 has a cell management unit 210 and a broadcast information transmission unit 220.

The cell management unit 210 manages a cell to communicate with the user equipment 100. Typically, the base station 200 serves one or more cells using different frequency bands, and the cell management unit 210 manages cell states of the respective cell such as communication states and congestions states and manages cell information (frequency bands, synchronization information, identification information of the respective cells) on the respective cells for the user equipment 100.

The broadcast information transmission unit 220 transmits the broadcast information on the cells as well as the broadcast information for the user equipment 100 supporting a first frequency bandwidth and the broadcast information for the limited bandwidth for the user equipment 100 supporting a second frequency bandwidth smaller than the first frequency bandwidth. Specifically, the broadcast information transmission unit 220 transmits the cell information for the respective cells managed by the cell management unit 210 as the broadcast information from the corresponding cells periodically. The base station 200 according to the present embodiment supports the coverage enhancement function of the user equipment 100 and transmits the broadcast information for the normal type of user equipment 100 supporting the system bandwidth (20 MHz or the like) and the broadcast information for the limited bandwidth for the LC type of user equipment 100 supporting only a limited frequency bandwidth (1.4 MHz or the like). For example, the broadcast information transmission unit 220 may transmit the MIB similar to the existing MIB and the SIBs (MTC-SIBx) having a size smaller than or equal to six resource blocks discussed for transmission and reception bandwidth of 1.4 MHz as the broadcast information for the limited bandwidth.

In one embodiment, the broadcast information transmission unit 220 may indicate an enhanced coverage level applied to the broadcast information for the limited bandwidth. Specifically, the broadcast information transmission unit 220 may indicate the EC level applied to the MTC-SIB 1 in spare bits in the PBCH. Upon determining that the coverage enhancement is required based on the measure reception quality depending on the indicated EC level, the user equipment 100 obtains the repetition information (including the number of repetitions, a TBS or the like) of the MTC-SIB 1 transmitted in the PBCH and receives the broadcast information in the enhanced coverage mode in accordance with the repetition information. For example, the EC level may be represented in two bits, and "00" may indicate that the coverage enhancement is not used, "01" may indicate EC level 1, "10" may indicate EC level 2, and "11" may indicate EC level 3. For example, the broadcast information transmission unit 220 can indicate EC level "00" to cause the user equipment 100 to receive the respective SIBs in accordance with the conventional reception scheme of system information without using the coverage enhancement function.

Figure 9:
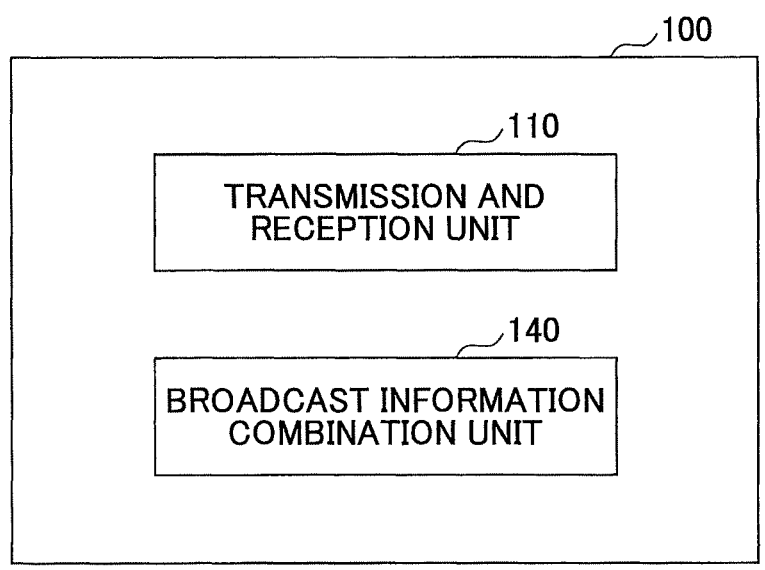
FIG. 9 is a block diagram for illustrating an arrangement of the user equipment according to one embodiment of the present invention.

Next, the user equipment according to another embodiment of the present invention is described with reference to FIG. 9. In the embodiments as stated above with reference to FIGS. 3-7, it has been described how the user equipment 100 supporting both the normal coverage mode and the enhanced coverage mode operates in any of the coverage modes. Here, if the user equipment 100 supporting the system bandwidth and using the coverage enhancement function is particularly focused on, the user equipment 100 would always use the reception scheme as described with reference to FIG. 4 to receive the broadcast information. In this case, as illustrated in FIG. 9, the user equipment 100 may have a broadcast information combination unit 140 for performing steps S105 and S106 in FIG. 5 instead of the cell measurement unit 120 and the broadcast information reception control unit 130.

For the broadcast information periodically transmitted from a cell, the broadcast information combination unit 140 forms the broadcast information by soft combining the broadcast information received across multiple cycles. Specifically, the broadcast information combination unit 140 may receive a first system information block transmitted at a first cycle from the cell at only a certain number of cycles to form the received first system information block and receive a second system information block across a number of windows indicated in an information element in the first system information block to form the received second system information block. Specifically, the transmission and reception unit 110 receives the MIB transmitted at the cycle of 40 ms, and the broadcast information combination unit 140 soft combines all the SIB is received across M cycles (M≥2) for the SIB 1 transmitted at the cycle of 80 ms, as illustrated in FIG. 4. In the illustrated example, M=5, and the parameter M may be set to a fixed value in accordance with the specification or may be set to a value that is configurable by the base station 200 and indicated in the MIB. Furthermore, the broadcast information combination unit 140 may soft combine all SIs received across N SI windows (N≥2) for the subsequent SIBs from the SIB 2. In the illustrated example, N=3, and the parameter N may be indicated in the SIB 1, for example, in an enhanced IE in schedulingInfo in the SIB 1. In other words, the broadcast information transmission unit 220 in the base station 200 indicates the number of windows used for the user equipment 100 to combine the second system information block (SIB 2, 3, . . . ) in an information element in the first system information block (SIB 1) transmitted from a cell at a first cycle.

According to the present embodiment, the SIB transmitted from the base station 200 can be formed by combining the SIB received across multiple cycles. In this manner, the SIB can be formed at a higher accuracy than that in the conventional reception scheme where the SIB received in each cycle is formed, which can address the problem where it is difficult to receive the system information due to coverage enhancement.

Next, signaling for the coverage enhancement function according to one embodiment of the present invention is described with reference to FIGS. 10-11.

FIG. 10 is a diagram for illustrating exemplary signaling according to one embodiment of the present invention. The base station 200 transmits the SIB 1 in signaling in a data structure as illustrated. The user equipment 100 forms the SIB 1 from the signaling received across multiple cycles and identifies the number (N) of SI windows to be soft combined for the subsequent SIBx (SIB 2, 3, . . . ) in accordance with a value indicated in "si-WindowMultiplex".

FIG. 11 is a diagram for illustrating exemplary signaling according to one embodiment of the present invention. The base station 200 transmits the MIB in signaling in a data structure as illustrated. The user equipment 100 forms the MIB from the signaling transmitted periodically and identifies the number (M) of cycles to be soft combined for the SIB 1 in accordance with a value indicated in "SIB1periodRepetition".

Although the embodiments of the present invention have been described in detail, the present invention is not limited to the above-stated specific embodiments, and various modifications and variations can be made within the spirit of the present invention as recited in claims.

This international patent application is based on and claims priority of Japanese Priority Application No. 2015-081022 filed on Apr. 10, 2015, Japanese Priority Application No. 2015-098862 filed on May 14, 2015 and Japanese Priority Application No. 2015-165299 filed on Aug. 24, 2015, the entire contents of which are hereby incorporated by reference.

LIST OF REFERENCE SYMBOLS

10: radio communication system
100: user equipment
110: transmission and reception unit
120: cell measurement unit
130: broadcast information reception control unit
140: broadcast information combination unit
200: base station
210: cell management unit
220: broadcast information transmission unit

The invention claimed is:

1. A user equipment, comprising:
a transceiver that transmits and receives radio signals to or from a base station,
wherein the transceiver receives system information blocks (SIB s) for limited bandwidth from a cell across multiple windows,
wherein the transceiver receives a master information block (MIB),
wherein the transceiver receives a first SIB transmitted from the cell in a number of cycles, and the first SIB comprises an information element that indicates a maximum number of windows for a second SIB,
wherein the transceiver receives the second SIB that is repeatedly transmitted across the indicated maximum number of windows,
wherein a number of repeated transmissions of the second SIB is indicated in the first SIB, and
wherein the first SIB is a SIB 1.

2. A base station, comprising:
a processor that manages a cell to communicate with a user equipment in limited bandwidth; and
a transmitter that transmits broadcast information on the cell,
wherein the transmitter transmits a master information block (MIB),
wherein the transmitter transmits a first system information block (SIB) that includes an information element that indicates a maximum number of windows on the cell for reception of a second SIB that is repeatedly transmitted by the transmitter,
wherein a number of repeated transmissions of the second SIB is indicated in the first SIB,
wherein the user equipment receives the second SIB across the indicated maximum number of windows, and
wherein the first SIB is SIB 1.

* * * * *